E. E. VON TELL.
MEANS FOR SECURING SHIPS' HATCH TARPAULINS OR SIMILAR FLEXIBLE COVERINGS.
APPLICATION FILED DEC. 11, 1917.

1,268,189. Patented June 4, 1918.

INVENTOR.
Edward Elias von Tell
ATTY

UNITED STATES PATENT OFFICE.

EDWARD ELIAS von TELL, OF GOTTENBORG, SWEDEN.

MEANS FOR SECURING SHIPS'-HATCH TARPAULINS OR SIMILAR FLEXIBLE COVERINGS.

1,268,189.

Specification of Letters Patent.

Patented June 4, 1918.

Application filed December 11, 1917. Serial No. 206,647.

*To all whom it may concern:*

Be it known that I, EDWARD ELIAS VON TELL, a subject of the King of Sweden, residing at Gottenborg, in the county of Gottenborg and Bohus and Kingdom of Sweden, have invented new and useful Improvements in Means for Securing Ships'-Hatch Tarpaulins or Similar Flexible Coverings, of which the following is a specification.

This invention refers to means for securing tarpaulins or the like flexible covering of ships' hatches and has for its object to simplify the management of the locking device and to insure a prompt and reliable securing of the hatch covering. It is a known expedient to make use of batten bars, disposed around all four weathersides of the hatch coaming and to move said battens with a parallel movement inwardly toward the sides of the coaming having stretched the tarpaulin over the top of the hatch with the edges of the tarpaulin folded down between the vertical sides of the coaming and the batten bars. This invention relates to such devices and consists in certain novel and characteristic features in connection with the methods for insuring the parallel movement of the batten bars.

In the accompanying drawing—

Figure 1:
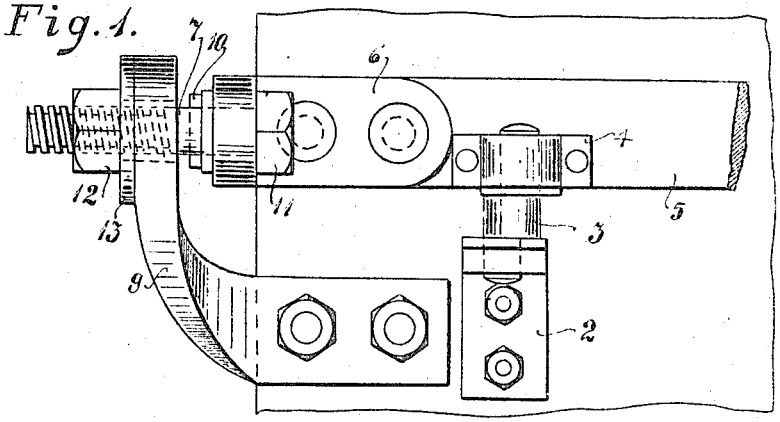
Figure 1 represents in elevation a corner portion of a hatch coaming with the improved device.

Around the four sides of the hatch coaming 1 there are disposed batten bars 5 provided with a plurality of bearing blocks 4, attached to the batten bars 5 by means of rivets, bolts or in any other suitable way. Corresponding to said bearing blocks 4 and beneath the batten bars 5 there is fastened to the hatch coaming by means of rivets or bolts or the like a plurality of brackets 2 provided in the horizontal flange with a vertical boring of the same character as the boring in the bearing blocks 4. A crank member 3 provided with two vertically directed pins 31 and 32 is pivotally mounted in each bracket 3 with the lower pin 32 and in the corresponding bearing block 4 with the upper pin 31.

In the one end the batten bars 5 are each provided with an abutment or angle member 6 the outwardly directed flange 61 of which carries a screw threaded bolt 7, which by means of a washer with split pin 10 and the bolt head 11 is prevented from moving longitudinally. Said bolt engages with a bracket 9, fastened to the hatch coaming one at each corner thereof, by means of an oblong hole 8 in the bracket 9, and a nut 12 with washer 13 bearing against the rear side of the bracket 9.

Figure 2:
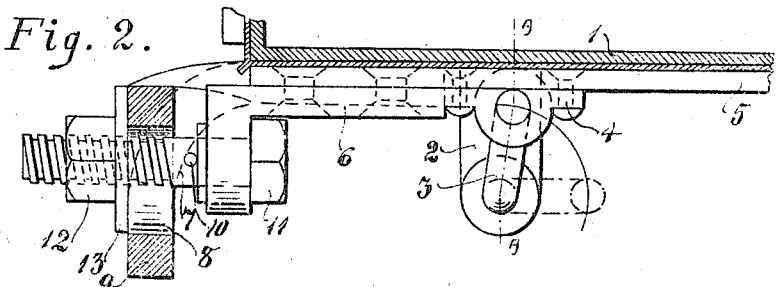
Fig. 2 is a plan view of the same parts.
Figure 3:
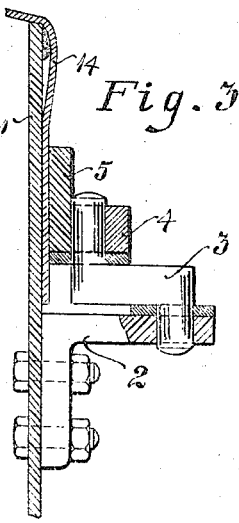
Fig. 3 is a vertical section through the same parts.
Figure 4:
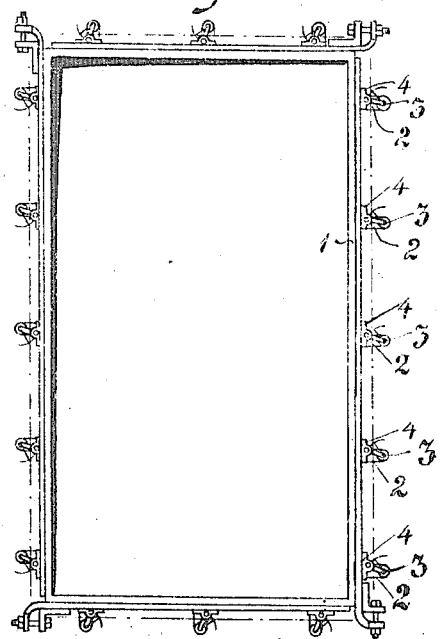
Fig. 4 illustrates on a reduced scale a plan view of the complete hatch with the improved device in operative position.

When operating the device, the tarpaulin is as usual stretched over the top of the hatch and the edges 14 folded down and disposed between the weather side of the hatch coaming 1 and the batten bar 5. It is to be understood that the batten bars 5 have previously been moved to a disengaging position with relation to the weatherside of the hatch coaming by means of rotating the nut 12 in a counter-clockwise direction, thus moving the batten bars away from their respective brackets 9, and swinging the cranks outwardly to the position indicated in dot and dash lines in Fig 2.

Having thus brought the tarpaulin 14 in due place the nuts 12 are set, whereby the bolts 7 cause their respective batten bars 5 to move longitudinally toward the corresponding bracket 9, the result from crank supporting devices 3, 2, 4 insuring a simultaneous lateral movement toward the hatch coaming, so that the folded down edges 14 of the tarpaulin are caused to be pressed between the sides of the hatch coaming and the batten bars and accordingly secured in a very effective manner.

To insure good working of the device it is necessary to give the crank members 3 such a length that they do not take a perpendicular position relative to the batten bar when operative, because otherwise the compressing effect would be lost. In this respect see Fig. 2.

Having thus particularly described and ascertained the nature of my invention and how the same is to be performed, what I claim as new and want to secure by Letters Patent is:

1. Means for securing ships' hatch tarpaulins or similar flexible coverings comprising batten bars capable of a combined longitudinal and lateral movement relative to the weather sides of the hatch coaming by means of crank members pivotally mounted in brackets on the sides of the hatch coaming as well as in bearing blocks on the batten bars.

2. Means for securing hatch coverings comprising batten bars arranged along the hatch coaming sides and supported by crank members pivotally in bearing blocks on the batten bars as well as in brackets on the hatch coaming, the length of said crank members being such a size, that the crank members obtain an oblique position relative to their batten bar when operative.

3. In means for securing hatch coverings the combination of batten bars capable of a combined longitudinal and lateral movement relative to the weather side of the hatch coaming, pivotally mounted crank members supporting said batten bars and means for positively pushing said batten bars in their longitudinal direction so as to cause the combined longitudinal and lateral movement with guidance of the pivotal crank members.

4. Means for securing hatch coverings comprising longitudinally and laterally movable batten bars supported by means of pivotally mounted crank members, screw threaded bolts arranged between abutments on the batten bars and brackets on the hatch coaming so as to be able to be set against said brackets and thereby cause the batten bars to move longitudinally and simultaneously, by means of the pivotal crank members, laterally relative to sides of the hatch coaming.

5. A device for securing a hatch covering comprising cranks mounted on the weatherside of the hatch coaming, a batten bar mounted on said cranks, and means for imparting longitudinal movement to said batten bar in either direction whereby said cranks will cause said batten bar to move in a horizontal plane and into or out of engagement with said coaming.

6. A device for securing a hatch covering comprising cranks mounted on the weatherside of the hatch coaming, a batten bar mounted on said cranks, a threaded bolt fixed to said batten bar, a bracket secured to the hatch coaming and formed with an elongated slot to loosely receive the threaded end of said bolt and permit lateral movement thereof, and a nut on said bolt and abutting said bracket whereby when said nut is rotated in one direction or the other said screw is advanced or retracted to cause said batten bar to move into or out of engagement with the hatch coaming.

7. A device for securing a hatch covering comprising cranks mounted on the weatherside of the hatch coaming, a batten bar mounted on said cranks, a bolt fixed to said batten bar, a bracket secured to the hatch coaming and formed with an elongated slot to loosely receive the threaded end of said bolt, and a nut on said bolt and abutting said bracket whereby when said nut is rotated in one direction or the other said screw is advanced or retracted to cause said batten bar to move longitudinally in one direction or the other whereby said crank will move said bar in a horizontal plane and into or out of engagement with the hatch coaming.

In testimony whereof I have affixed my signature in presence of two witnesses.

EDWARD ELIAS von TELL.

Witnesses:
  GUSTAV GETH,
  ALEX. FAZELLENY.

Copies of this patent may be obtained for five cents each, by addressing the "Commissioner of Patents, Washington, D. C."